United States Patent [19]

Takahashi

[11] Patent Number: 4,669,501

[45] Date of Patent: Jun. 2, 1987

[54] FUEL TANK'S INSIDE ARRANGEMENT FOR RESERVING FUEL TO HOLD FUEL OUTLET SUBMERGED DURING VEHICLE TURN

[75] Inventor: Teruo Takahashi, Zama, Japan

[73] Assignee: Nissan Motor Co., Ltd., Japan

[21] Appl. No.: 843,618

[22] Filed: Mar. 25, 1986

[30] Foreign Application Priority Data

Mar. 30, 1985 [JP] Japan ............................. 60-67395

[51] Int. Cl.$^4$ ............................................. F17D 1/08
[52] U.S. Cl. ...................................... 137/576; 137/571
[58] Field of Search ............. 137/262, 264, 265, 571, 137/572, 574, 576

[56] References Cited

U.S. PATENT DOCUMENTS

| | | | |
|---|---|---|---|
| 1,652,665 | 12/1927 | Frick | 137/264 |
| 1,732,505 | 10/1929 | Dawson | 137/576 X |
| 2,814,337 | 11/1957 | Foster | 137/576 X |
| 3,049,171 | 8/1962 | Neverburg et al. | 137/574 X |
| 3,277,931 | 10/1966 | Emrick | 137/264 X |
| 3,881,457 | 5/1975 | Benner et al. | 137/574 X |
| 4,178,004 | 12/1979 | Shinoda et al. | 137/264 X |
| 4,342,406 | 8/1982 | Lee | 137/576 X |
| 4,354,521 | 10/1982 | Harde | 137/574 X |
| 4,397,333 | 8/1983 | Liba | 137/574 |

FOREIGN PATENT DOCUMENTS 50-106717  2/1975  Japan.
800720  9/1958  United Kingdom ............... 137/265

Primary Examiner—Alan Cohan
Assistant Examiner—John A. Rivell
Attorney, Agent, or Firm—Leydig, Voit & Mayer

[57] ABSTRACT

An inside arrangement to be fixed to an interior bottom of a fuel tank for surrounding a fuel outlet comprises a main reservoir of metal and a complementary reservoir of synthetic resin. The main reservoir is shaped like a rectangular box to form a reservoir chamber therein, and formed with a mounting hole. The complementary reservoir has an antechamber formed therein, and a tubular portion projecting outwardly from one side wall and having stopper projections. The complementary reservoir is fixed to the main reservoir simply by inserting the tubular portion into the mounting hole of the main reservoir.

12 Claims, 11 Drawing Figures

FUEL TANK'S INSIDE ARRANGEMENT FOR RESERVING FUEL TO HOLD FUEL OUTLET SUBMERGED DURING VEHICLE TURN

BACKGROUND OF THE INVENTION

The present invention relates to a liquid tank such as a fuel tank of a motor vehicle, and more specifically to an arrangement mounted inside a liquid tank for preventing a liquid surface from lowering below a liquid outlet tube especially during a sharp turn of a vehicle.

Japanese Utility Model provisional publications No. 55-143252 and No. 50-106717 disclose conventional examples of such an arrangement of a fuel tank, both of which require troublesome spot welding and sealing.

SUMMARY OF THE INVENTION

It is an object of the present invention to provide an inside arrangement of a liquid tank for holding a liquid outlet under a liquid which can be easily assembled without requring spot welding and sealing.

According to the present invention, an inside arrangement of a liquid tank, such as a motor vehicle's fuel tank, comprises a main reservoir to be mounted in the liquid tank, and a complementary reservoir mounted on the main reservoir. The main reservoir has a reservoir chamber formed therein for enclosing an end of a liquid outlet tube and reserving a liquid in the reservoir chamber to hold the end of the liquid outlet tube below a liquid surface even if the liquid surface is inclined. The main reservoir has at least a support side wall which is formed with a mounting hole. The complementary reservoir has an antechamber formed therein, and a mouth which is formed on one side of the complementary reservoir so that the liquid can flow into and out of the antechamber through the mouth. The complementary reservoir has at least an attachment side wall which is formed with a tubular portion. The tubular portion is situated apart from the mouth, and projects outwardly from the attachment side wall. A back passage is formed in the tubular portion so that the liquid can flow into and out of the antechamber through the back passage. The tubular portion is formed with at least one stopper edge projecting outwardly from the tubular portion. The complementary reservoir is fixed to the main reservoir by inserting the tubular portion of the complementary reservoir through the mounting hole of the main reservoir in such a manner that the support side wall of the main reservoir is clamped between the edge of the tubular portion and the attachment side wall of the complementary reservoir.

The comlementary reservoir may be disposed within the main reservoir or may be attached to an outside surface of the main reservoir.

DETAILED DESCRIPTION OF THE INVENTION

Figure 9:
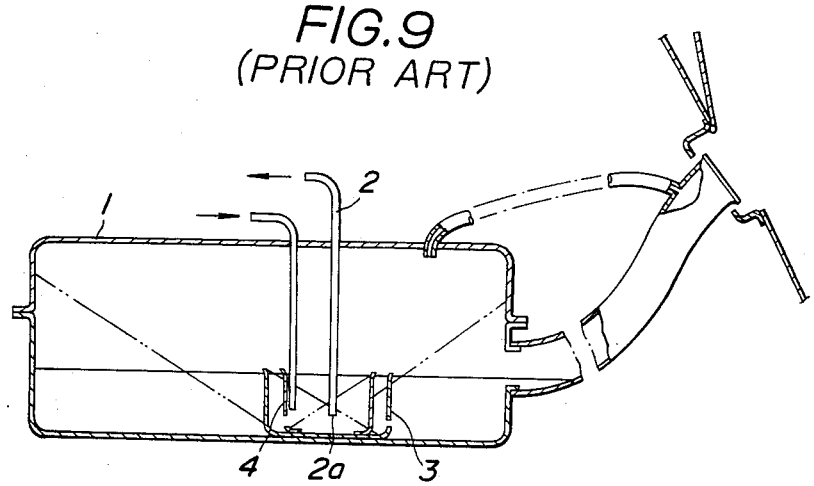
FIG. 9 is a sectional view of a fuel tank having a conventional type inside arrangement.
Figure 10:
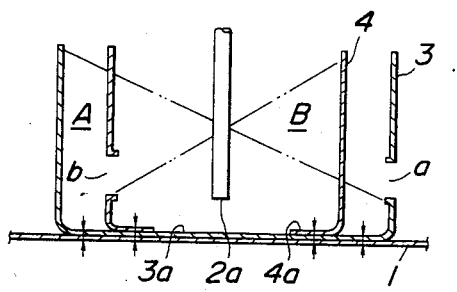
FIG. 10 is a sectional view of an inside arrangement of one conventional type.
Figure 11:
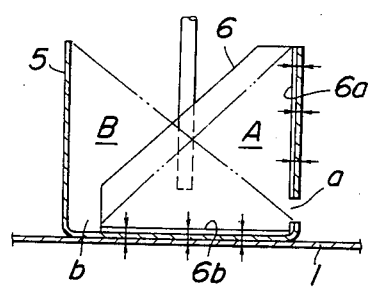
FIG. 11 is a sectional view of an inside arrangement of another conventional type.

During a sharp left or right turn of a vehicle, a liquid surface in a fuel tank 1 is inclined as shown by two-dot chain lines in FIG. 9 by reason of acceleration of a considerable magnitude in a horizontal direction. FIGS. 10 and 11 show conventional examples of an inside arrangement of a fuel tank for preventing a liquid surface from lowering below an end $2a$ of a fuel outlet tube 2 during a turn of a vehicle (as disclosed in the above-mentioned Japanese references). The arrangement of FIG. 10 has a primary container 3 having a bottom $3a$ and a primary inlet a on one side, and a secondary container 4 whose top and bottom are open. The secondary container 4 is disposed in the primary container 3, and formed with a secondary inlet b on the opposite side to the primary inlet a. A primary chamber A formed in the primary container 3 is in communication with a secondary chamber B formed in the secondary container 4 through the secondary inlet b. Flanges $4a$ of the secondary container 4 is fastened to the bottom $3a$ of the primary container 3 by spot welding. Therefore, this arrangement requires spot welding and operations for sealing the welded portions.

In the conventional example of FIG. 11, an interior space of a container 5 is divided by a partition plate 6 into a primary chamber A in front of the partition plate 6 and a secondary chamber B behind the partition wall 6. The fuel supplied to the primary chamber A through a primary inlet a on the right flows into the secondary chamber B through a secondary inlet b formed on the left side of the partition plate 6. Side flange $6a$ and bottom flange $6b$ of the partition plate 6 are fastened to the container 5 by spot welding. Therefore, this arrangement also requires spot welding and sealing. It is possible to eliminate the necessity of sealing by employing seam welding for joining the flanges of the partition plate 6 to the container 5. In this case, however, control of working (or machining) accuracy of the partition plate 6 and the container 5 is difficult, and special welding electrodes are required, so that manufacturing cost is increased.

Figure 1:
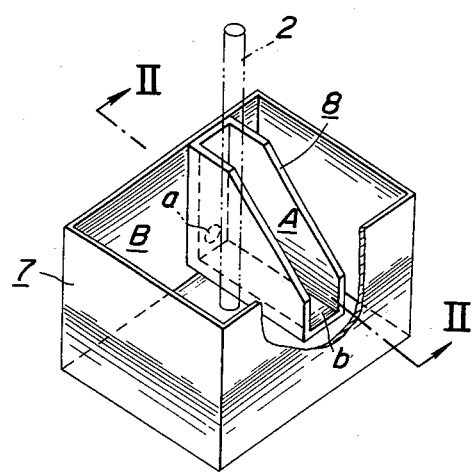
FIG. 1 is a perspective view of a liquid tank's inside arrangement of a first embodiment according to the present invention.
Figure 2:
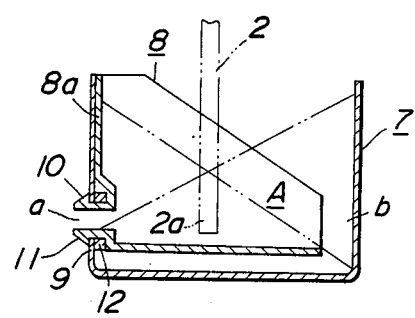
FIG. 2 is a sectional view taken on a line II—II of FIG. 1.

A first embodiment of the present invention is shown in FIGS. 1 and 2. A liquid tank's inside arrangement of the first embodiment has a main reservoir 7 and a complementary reservoir 8. The inside arrangement is adapted to be fixed to a bottom of the fuel tank.

The main reservoir 7 of this embodiment is shaped like a rectangular box, and has a reservoir chamber (secondary chamber) B formed therein. The main reservoir 7 of this embodiment has a flat bottom, left and right first upright side walls which are parallel to each other, and two second upright side walls which are parallel to each other. The left first side wall of the main reservoir 7 is situated on the left as viewed in FIG. 2, and serves as a support side wall. The main reservoir 7 is made by forming sheet or plate metal into the shape of the main reservoir 7 by the metal forming method of drawing.

The complementary reservoir 8 of this embodiment is shaped approximately like a rectangular box whose top and one side are open so that its horizontal section is U-shaped. The open side of the complementary reservoir 8 serves as a mouth. The complementary reservoir 8 has an antechamber (primary chamber) A formed therein. The complementary reservoir 8 of this embodiment has a flat bottom, two parallel upright side walls spaced at a relatively short distance from each other, and a narrow upright side wall 8a extending between the two parallel side walls, and serving as an attachment side wall. The complementary reservoir 8 is made of synthetic resin having a chemical resistance to a fuel or other liquid contained in the tank.

The left first support side wall of the main reservoir 7 is formed with a non-circular mounting hole 9 near the bottom. The narrow attachment side wall 8a of the complementary reservoir 8 is integrally formed with a tubular portion 10 near the bottom. The tubular portion 10 projects outwardly from the narrow attachment side wall 8a, and has therein a liquid passage extending from the antechamber A. An outermost end of the tubular portion 10 is formed with one or more stopper projections 11 which project from an outer periphery of the tubular portion 10.

In the first embodiment, the complementary reservoir 8 is disposed within the main reservoir 7, and the tubular portion 10 of the complementary reservoir 8 is inserted in the non-circular mounting hole 9 of the main reservoir 7 from the inside of the main reservoir 7. An outer surface of the narrow attachment side wall 8a of the complementary reservoir 8 is in contact with an inner surface of the left support side wall of the main reservoir 7. The stopper projections 11 prevent the tubular portion 10 from being extracted from the mounting hole 9. A packing 12 is mounted on the tubular portion 10. The packing 12 is clamped between the narrow attachment side wall 8a of the complementary reservoir 8 and the left support side wall of the main reservoir 7. A portion of the left support side wall of the main reservoir 7 surrounding the mounting hole 9 is clamped between the stopper projections 11 of the tubular portion 10 and the packing 12. In this way, the complementary reservoir 8 is fixed to the main reservoir 7 by the tubular portion 10 inserted in the mounting hole 9 in such a manner that the fuel cannot flow out of the reservoir chamber B directly through the mounting hole 9.

In this embodiment, the passage formed in the tubular portion 10 serves as the primary inlet a and the mouth (the open side) of the complementary reservoir 8 opposite to the narrow attachment side wall 8a serves as the secondary inlet b. The liquid flows into the antechamber A through the primary inlet a, and then flows into the reservoir chamber B through the secondary inlet b situated on the opposite side to the primary inlet. The fuel outlet tube 2 extends vertically from the above into the reservoir chamber B, and the lower end 2a of the fuel outlet tube 2 is positioned in the reservoir chamber B near the bottom. When an acceleration of a large magnitude acts in the leftward or rightward direction in FIG. 2, the fuel surface is inclined as shown by two-dot chain lines in FIG. 2. The bottom end 2a of the fuel outlet tube 2 is always maintained under the fuel.

Figure 3:
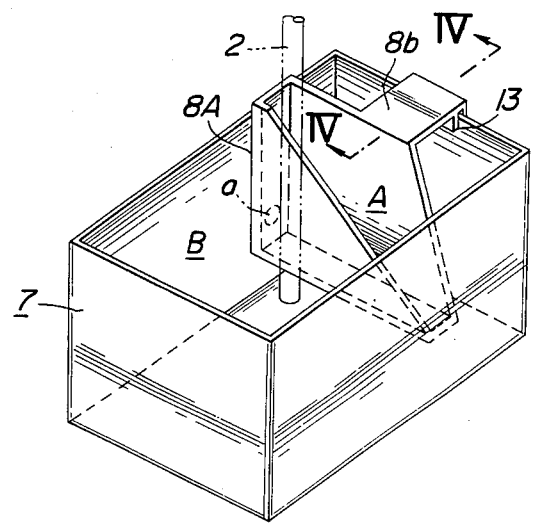
FIG. 3 is a perspective view of an inside arrangement of a second embodiment according to the present invention.
Figure 4:
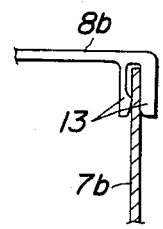
FIG. 4 is a sectional view taken on a line IV—IV of FIG. 3.

A second embodiment of the present invention is shown in FIGS. 3 and 4. The second embodiment is different from the first embodiment only in that a complementary reservoir 8A of the second embodiment is further formed with an arm 8b for fixing the complementary reservoir 8A to the main reservoir 7 more firmly. The complementary reservoir 8A of the second embodiment is formed integrally with the arm 8b which extends substantially horizontally from a top end of one of the two parallel side walls of the complementary reservoir 8A. The arm 8b has clamp fingers 13 extending downwardly from an outermost end of the arm 8b. The clamp fingers 13 grip a top end of one of the second side walls 7b of the main reservoir 7. Therefore, the complementary reservoir 8A of the second embodiment is fixed to the main reservoir 7 by the tubular portion 10 inserted in the mounting hole 9 of the first side wall (support side wall) of the main reservoir on one hand, and by the arm 8b gripping the second side wall 7b perpendicular to the first side wall on the other hand.

Figure 5:
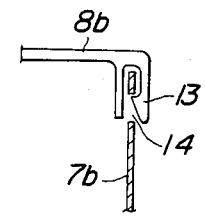
FIG. 5 is a sectional view similar to FIG. 4 but showing a modification of FIG. 4.

FIG. 5 shows a modification of the second embodiment. In this modification, the second side wall 7b of the main reservoir 7 is formed with a hole 14 for receiving a projection formed in one of the clamp fingers 13 of the arm 8b. Therefore, the arm 8b of FIG. 5 can grip the second side wall 7b more firmly.

Figure 6:
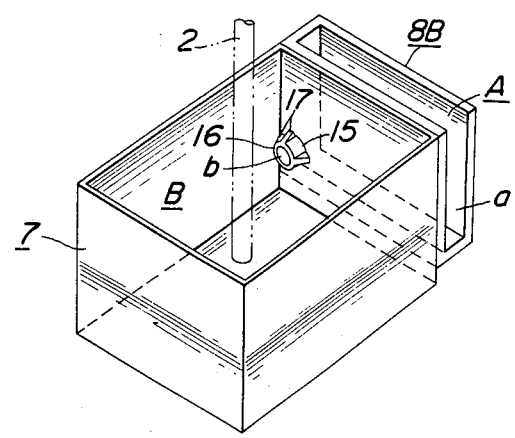
FIG. 6 is a perspective view of an inside arrangement of a third embodiment according to the present invention.

A third embodiment of the present invention is shown in FIG. 6. A complementary reservoir 8B of the third embodiment is placed outside the main reservoir 7. The complementary reservoir 8B of synthetic resin has a flat bottom, two parallel upright side walls and a narrow upright side wall extending between the parallel side walls. One of the parallel side walls of the complementary reservoir 8B is formed integrally with a tubular portion 16 projecting outwardly from the side wall, and having stopper projections 17 which project from an outer periphery of the tubular portion 16. In the third embodiment, the parallel side wall having the tubular portion 16 serves as the attachment side wall. The tubular portion 15 is located near the narrow side wall, and apart from the open side opposite to the narrow side wall. The open side (mouth) serves as the primary inlet a. The tubular portion 16 is inserted into a mounting hole 15 formed in one of the side walls of the main reservoir 7 from the outside. The complementary reservoir 8B is fixed to the main reservoir 7 by the stopper projections 17. The passage of the tubular portion 15 serves as the secondary inlet b.

Figure 7:
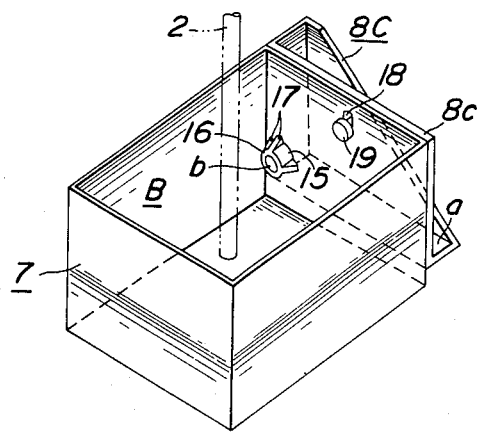
FIG. 7 is a perspective view of an inside arrangement of a fourth embodiment according to the present invention.

FIG. 7 shows a fourth embodiment of the present invention. The fourth embodiment is different from the third embodiment of FIG. 6 in that a complementary reservoir 8C of the fourth embodiment is fixed to the main reservoir 7 further by a pin 19. The attachment side wall 8c which is formed with the tubular portion 16 is further formed with the pin 19 projecting outwardly from the side wall 8c. The main reservoir's support side wall having the mounting hole 15 is further formed with a fixing hole 18. The pin 19 is inserted into the fixing hole 18 from the outside of the main reservoir 7, and fixed to the surrounding of the fixing hole 18 by applying heat to melt the pin partly. The attachment side wall 8c is rectangular and abuts on the support side wall of the main reservoir 7. The side wall of the complementary reservoir 8C of the fourth embodiment opposite and parallel to the attachment side wall 8c is triangular as shown in FIG. 7.

Figure 8:
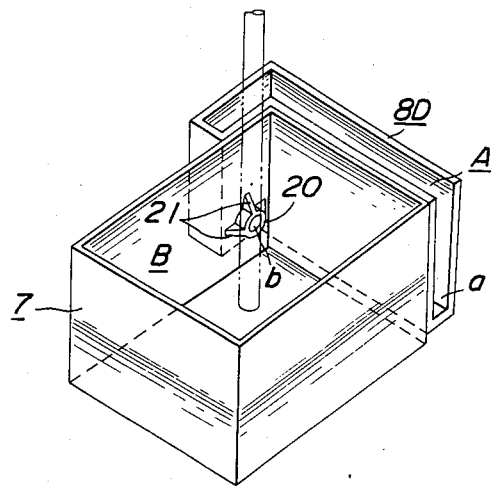
FIG. 8 is a perspective view of an inside arrangement of a fifth embodiment according to the present invention.

FIG. 8 shows a fifth embodiment of the present invention. A complementary reservoir 8D of the fifth embodiment has an L-shaped horizontal section one end of which is open for serving as the primary inlet a, and the other end of which is closed. The complementary reservoir 8D of the fifth embodiment has a flat bottom, an L-shaped inner upright side wall, an L-shaped outer upright side wall and a narrow upright side wall extending between the inner and outer side walls. The inner side wall consists of a first portion and a second portion perpendicular to each other. The outer side wall consists of a first portion parallel to the first portion of the inner side wall, and a second portion parallel to the second portion of the inner side wall. The narrow side wall extends between ends of the first portions of the inner and outer side walls. A tubular portion 20 is formed in the first portion of the inner side wall of the complementary reservoir 8D near the bottom. The tubular portion 20 is formed with stopper projections 21 like the tubular portion of the preceding embodiments. The complementary reservoir 8D laps over one of the four corners of the main reservoir 7 so that the first portion of the inner side wall of the complementary reservoir 8D abuts on the outer surface of one side wall of the main reservoir 7 and the second portion of the inner side wall abuts on the adjacent side wall of the main reservoir 7. The tubular portion 20 is inserted in a mounting hole formed in one side wall of the main reservoir 7.

In the third, fourth and fifth embodiments shown in FIGS. 6, 7 and 8, the fuel flows into the antechamber A of the complementary reservoir 8B, 8C or 8D through the primary inlet a, and then flows into the reservoir chamber B of the main reservoir 7 from the antechamber A through the secondary inlet b formed in the tubular portion 16 or 20. Therefore, the bottom end of the fuel outlet tube 2 inserted in the reservoir chamber B is held below the fuel surface.

The arrangements of the present invention can be fabricated rapidly and inexpensively as compared with the convensional arrangements.

What is claimed is:

1. An inside arrangement of a liquid tank, comprising;
a main reservoir having a reservoir chamber formed therein for enclosing an end of a liquid outlet tube, and reserving a liquid therein to hold the end of the liquid outlet tube sugmerged even if the liquid surface is inclined, said main reservoir having at least a support side wall formed with a mounting hole, and
a complementary reservoir having an antechamber formed therein, and a mouth formed on one side for allowing the liquid to flow therethrough into and out of said antechamber, said complementary reservoir having at least an attachment side wall formed with a tubular portion which is situated apart from said mouth and which projects outwardly from said attachment side wall and has therein a back passage for allowing the liquid to flow therethrough into and out of said antechamber, said tubular portion being formed with at least one stopper edge projecting outwardly from said tubular portion, said tubular portion being inserted through said mounting hole of said main reservoir in such a manner that said support side wall of said main reservoir is clamped between said stopper edge of said tubular portion and said attachment side wall of said complementary reservoir so as to fix said complementary reservoir to said main reservoir.

2. An arrangement according to claim 1 wherein a packing is disposed around said tubular portion between said support side wall of said main reservoir and said attachment side wall of said complementary reservoir.

3. An arrangement according to claim 1 wherein said complementary reservoir is made of synthetic resin.

4. An arrangement according to claim 1 wherein said complementary reservoir is disposed within said main reservoir so that said back passage connects said antechamber with an outside of said main reservoir.

5. An arrangement according to claim 4 wherein said complementary reservoir has a bottom and two parallel side walls between which both of said attachment side wall and said mouth extend.

6. An arrangement according to claim 4 wherein said complementary reservoir further has an arm for gripping a rim of said main reservoir.

7. An arrangement according to claim 6 wherein said main reservoir has a bottom, an opposite side wall opposite to said support side wall and two adjacent side walls between which said support side wall and said opposite side wall extend, said arm having two fingers clamping a top portion of one of said adjacent side wall.

8. An arrangement according to claim 7 wherein said top portion of said adjacent side wall is formed with a recess engaging with an edge of one of said fingers.

9. An arrangement according to claim 1 wherein said complementary reservoir is disposed outside said main reservoir so that said back passage connects said antechamber with said reservoir chamber.

10. An arrangement according to claim 9 wherein said complementary reservoir has a bottom, an opposite side wall opposite to said attachment side wall, and an adjacent side wall extending between said attachment side wall and said opposite side wall, said mouth extending between said attachment and opposite side walls.

11. An arrangement according to claim 10 wherein said main reservoir is further formed with a fixing hole, and said complementary reservoir is formed with a pin inserted in said fixing hole and joined to said main reservoir by applying heat to melt said pin partly.

12. An arrangement according to claim 9 wherein said complementary reservoir has an L-shaped horizontal cross sectional shape attached to one corner of said main reservoir.

* * * * *